United States Patent [19]
Trzeciak

[11] 4,077,657
[45] Mar. 7, 1978

[54] ADJUSTABLE BENT SUB

[75] Inventor: Kurt H. Trzeciak, Fountain Valley, Calif.

[73] Assignee: Smith, International, Inc., Newport Beach, Calif.

[21] Appl. No.: 669,312

[22] Filed: Mar. 22, 1976

[51] Int. Cl.² ............................................. F16L 27/00
[52] U.S. Cl. ....................................... 285/184; 285/93; 285/330; 403/4; 175/61; 175/256; 175/320
[58] Field of Search ................. 285/118, 330, 184, 93; 175/61, 256, 62, 74, 320, 75; 64/1 S; 403/4

[56] References Cited

U.S. PATENT DOCUMENTS

| 327,877 | 10/1885 | Hodges | 285/184 |
| 2,423,069 | 6/1947 | McElhose et al. | 285/184 X |
| 3,627,356 | 12/1971 | Anderson | 285/118 |

Primary Examiner—Dave W. Arola
Attorney, Agent, or Firm—Subkow and Kriegel

[57] ABSTRACT

This invention relates to a device for selectively setting the axial alignment of sections of pipe from axial coincidence to an obtuse angle between the pipe sections.

14 Claims, 10 Drawing Figures

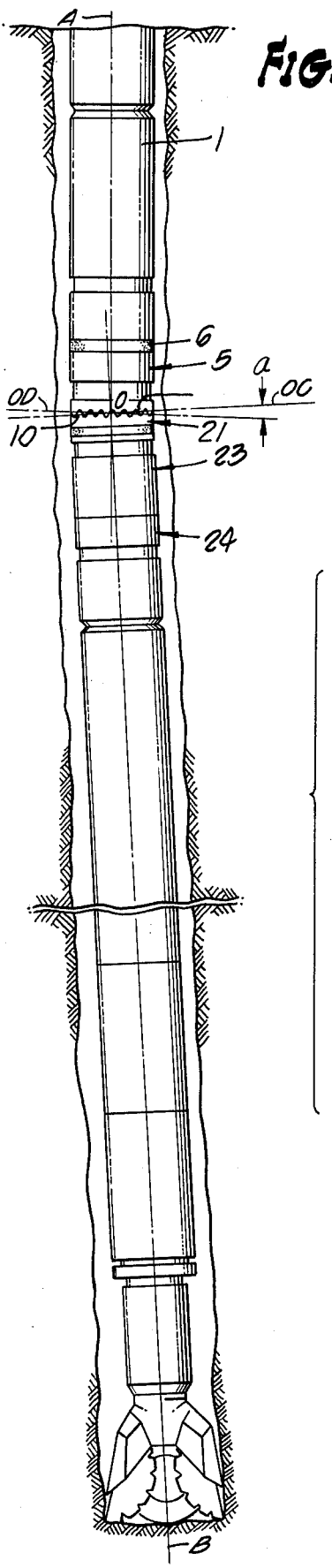
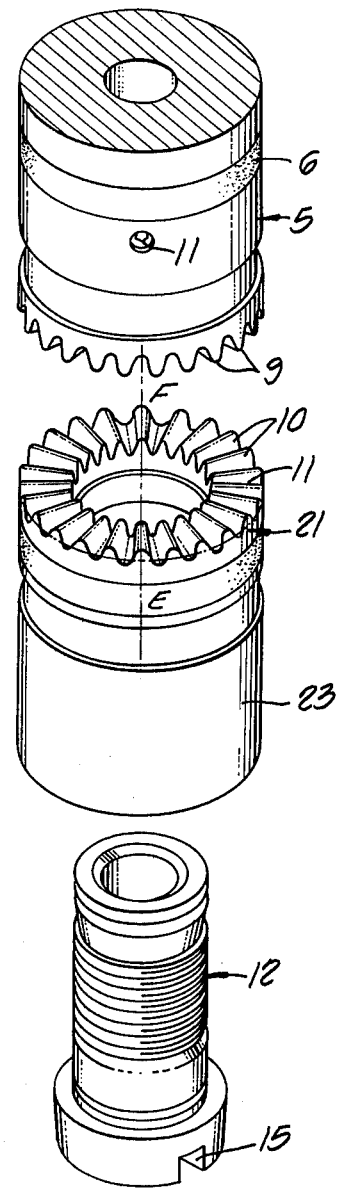
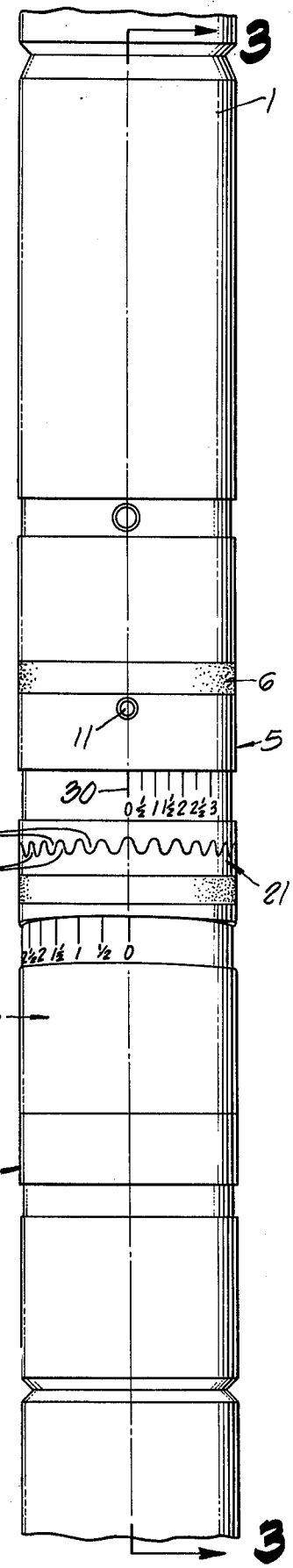
FIG. 1.
FIG. 2.
FIG. 10.

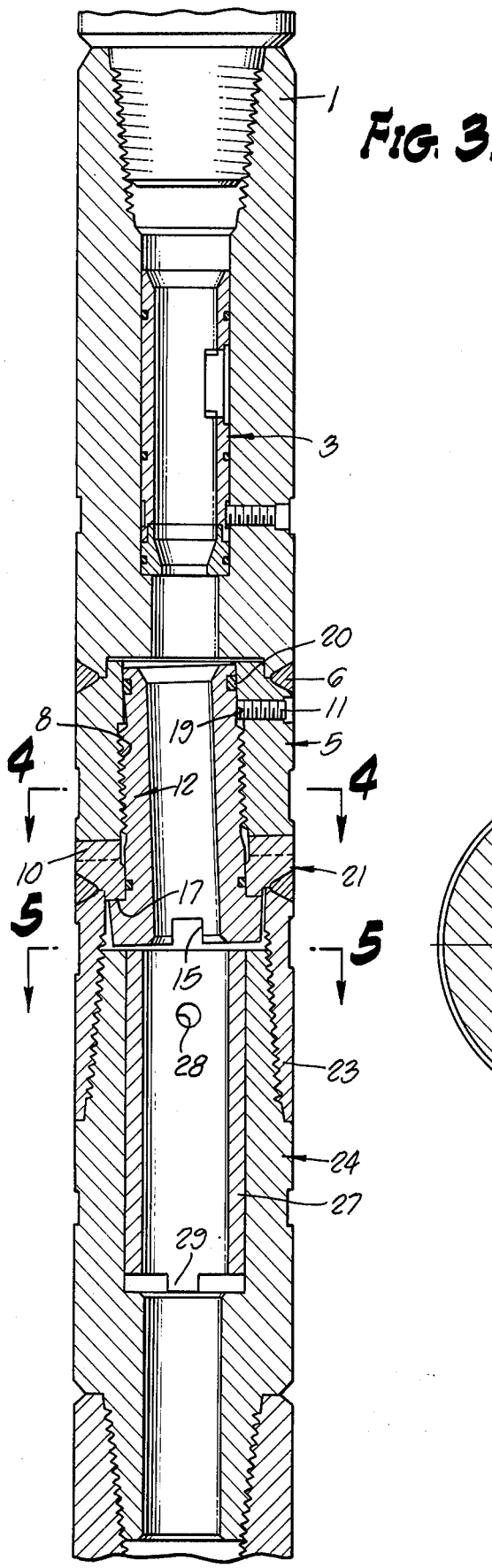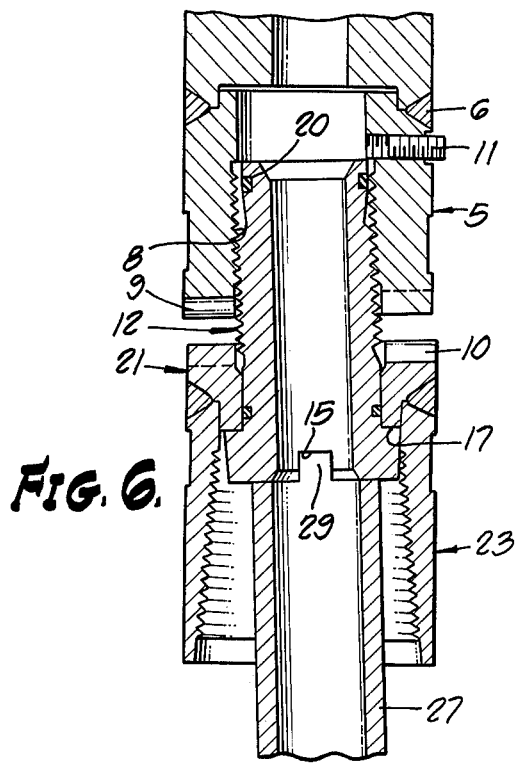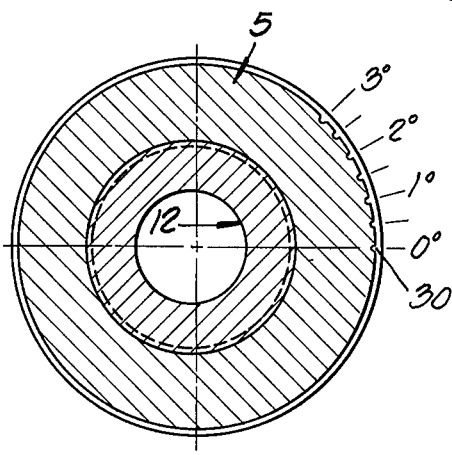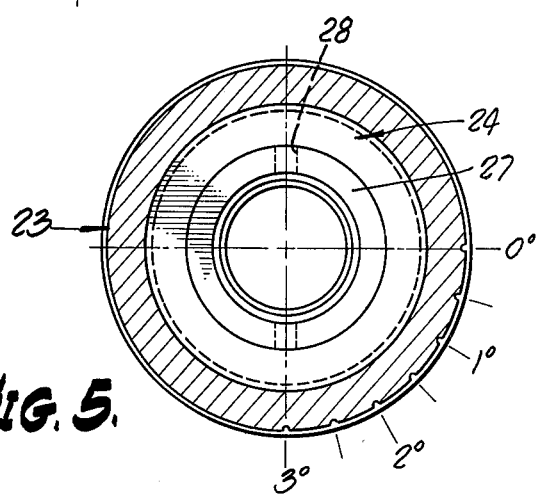

ADJUSTABLE BENT SUB

This invention relates to a device for selectively setting the axial alignment of sections of pipe from axial coincidence to an obtuse angle between the pipe sections.

BACKGROUND OF THE INVENTION

The prior art has used devices such as a bent sub and bent housing whereby it is possible to assemble two sections of drill string so that the axis of one section will be at an angle to the axis of another and adjacent pipe section. Such devices have been employed in drilling deviated bore holes whereby the vertical inclination of the hole may be changed.

The bent sub consists of a tool joint. The tubular section has threaded ends. The axis of one of the threaded ends is coincident with the axis of the tubular section. The axis of the opposite end is at an angle to the axis of the tubular section.

When the bent sub is used to connect pipe sections, such as drill pipe stands, the axis of adjacent stands will have the angle imposed with respect to each other established by the bent sub.

The bent sub, when a down-hole motor is used, usually is placed between the drill collars which are used to impart the desired weight on the bit and the down-hole motor.

The permissible angle which may be established depends on the diameter of the bore and the diameter of the bit. The angle may not exceed that which will cause the bit to cut into the casing or bore hole by dragging along the casing or the bore hole through which it passes.

The initial angle may not, however, be the maximum angle permitted by the bore hole. The angle is also determined by the rate at which the vertical angle of the bore hole axis is to change with depth to give the arc which the drilling program demands for the bore hole to reach its objective.

The rate of build-up of angle is, however, also determined by the pendulum effect of the drill pipe which has a tendency to reduce the vertical angle of the bore hole. It thus may require an increase or decrease in the angle of the bent sub as the bore hole progresses.

These considerations require an inventory of bent subs of different angles as the hole progresses; and when the bent subs are to be interchanged to increase or decrease the angle, the drill string must be disassembled at the bent sub and a different bent sub introduced.

SUBJECT MATTER OF MY INVENTION

It is an object of my invention to provide a bent sub suitable for oil field drill pipe designed so that the angles which the axes of adjacent sections make with each other may be varied to adjust the angle. This I accomplish by making the sub in two parts. The adjacent ends of the parts are formed so that the facing, that is, the mating ends of the parts are each at a mating plane which is at the same acute angle to the axes of the parts where they are coincident. In one position, here referred to as 0° rotation, the axes of the parts are coincident with each other. By rotating one of the parts about the axis of the other part, the axes will become inclined to each other. The vertical angles which the axes make with each other will depend on the angle of the mating plane to the coincident axis and the degree of the angle of rotation of one part about its axis with respect to the axis of the mating part.

As the parts rotate with respect to each other, the planes are always parallel and coincident since their cross sections are the same geometry and one may be placed in coincidence in any position. However, the inclination of the axis with respect of the other will deviate from coincidents as described above.

I provide a sub made of two tubular parts. The parts meet at a mating end formed with respect to a common mating plane which is at an angle to the axis of the part.

Means is provided to lock the mating ends of the parts to each other at selected angular rotation of the ends with respect to each other.

These and other objects of my invention will be understood by reference to the drawings, of which FIG. 1 is a vertical partial view of a drill string employing my invention;

FIG. 2 is an enlarged fragmentary section of FIG. 1;

FIG. 3 is a vertical section on line 3—3 of FIG. 2;

FIG. 4 is a section on line 4—4 of FIG. 3;

FIG. 5 is a section on line 5—5 of FIG. 3;

FIG. 6 is a fragmentary portion of FIG. 3 showing the assembly in a different stage of assembly;

FIG. 10 is an exploded perspective view.

Figure 7:
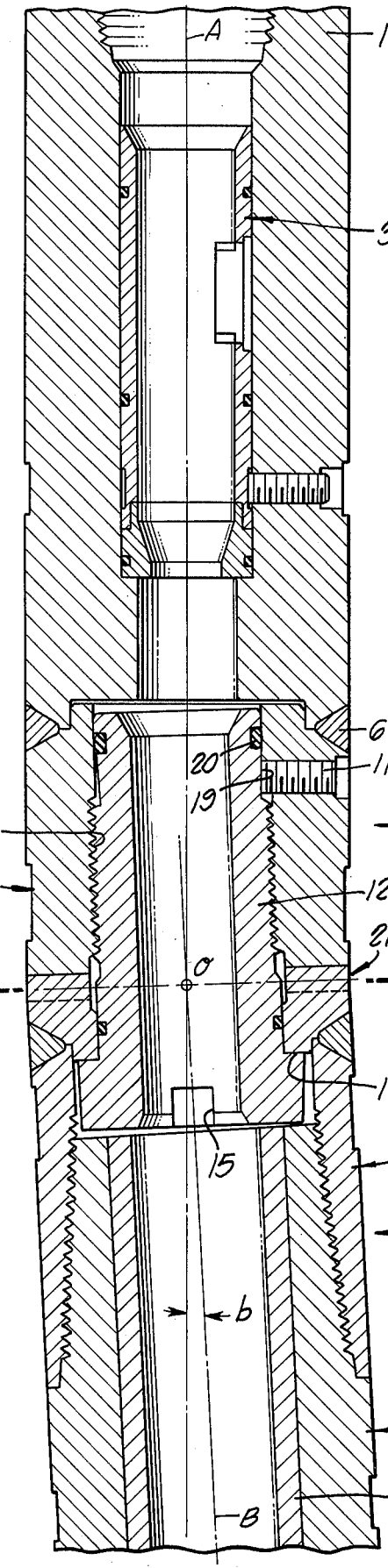
FIG. 7 is a section similar to FIG. 3 but with parts rotated.

The alignment sub 23 is connected to a sub 24 whose axis is coincident with the axis of sub 1 and may carry a wrench 27 having dog ends 29 which fit into the notch 15. Bore holes 28 may be provided for insertion of a rod to aid in securing the nut.

The face of the sub 21 is indexed with degree markings (see FIG. 2) to match the index mark 30 on the sub 5.

In order to introduce a desired angular bend between 1 and 24, the sub is broken at the free end of 24, from the box end of 23. The wrench 27 is removed and the nut 12 retracted (see FIG. 5). This disengages teeth 9 and 10. The sub 23 is rotated the desired angular distance to give the desired vertical angular displacement as read on the face of 21 where the angular displacement is marked (see FIGS. 2 and 4). The teeth 9 and 10 are engaged at the new location and the nut 12 is secured to lock 23 and 5 together. The string may then be assembled.

As illustrative of the angular values attainable, the following is an example and is not intended to be a limitation of my invention.

The "0" degree mark on each part 5 and 21 is positioned at the intersection of the transverse axis E-F of the elliptical periphery of the plane OC of the crowns and roots of the teeth 9 and 10 (see FIGS. 3 and 7) where it meets the cylindrical surface of the parts 21 and 5.

To adjust the sub to any desired angle, the part 24 is separated at the threads from the part 21, the wrench 27 removed, the dogs 29 entered into the notches 15, and the nut 12 is removed. The parts are positioned on each other with the "0" degree marks coincident (see FIG. 2). In this position, the axes OA and OB are coincident (see FIG. 1). The plane of OC is at an angle "a" with respect of the plane OD which is perpendicular to the coincident axes OA and OB. With the part 21 held firmly in place, for example, in a vise, the part 21 is rotated clockwise one tooth and the nut 12 reinserted. The nut 12 is reinserted to lock 21 to 5.

Figure 8:
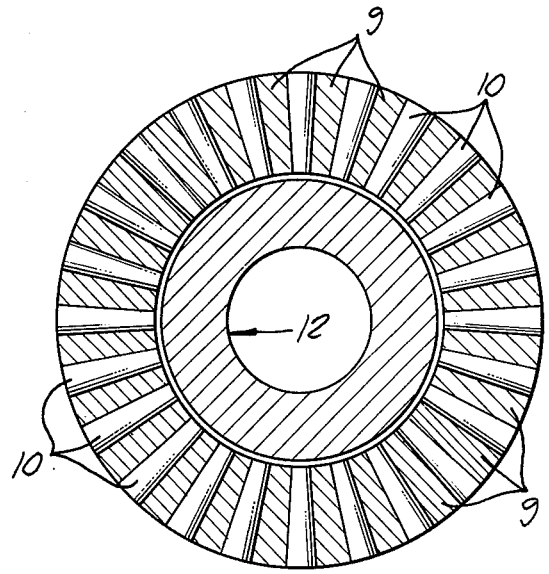
FIG. 8 is a section on line 8—8 of FIG. 7.

The angular displacement "$d$" depends on the number of teeth where as illustrated and described are at equal degrees from each other and "$d$" may thus be varied by equal angular degrees. In the form illustrated (see FIG. 8), the displacement of one tooth equals a rotation of 15° since there are 24 teeth. The vertical angle "$b$" is the acute angle between the axis of 5 and the axis of 23. (See FIG. 7)

Figure 9:
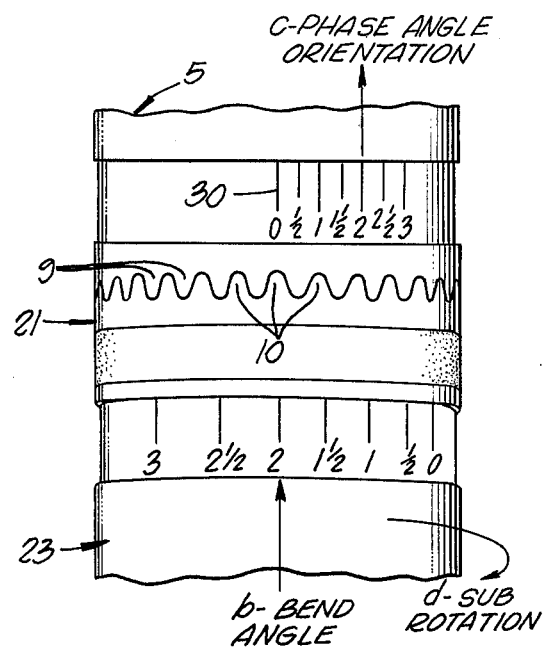
FIG. 9 is a fragmentary view on line 9—9 of FIG. 7.

The process is repeated for each tooth and the magnitude of the vertical angle marked at each tooth. (See FIGS. 2 and 9)

The bend angle "$b$" is given by the following formula:

$$\sin b = (\sin a \sin d)/\cos c$$

The relation between the angles $a$, $b$, and $c$ are given by the relation:

$$c = \tan^{-1}[\cos a\,(1 - \cos d)/\sin d\,]$$

$$b = \sin^{-1}[\sin a \cos a\,(1 - \cos d)/\sin c\,]$$

The accuracy of the angle "$b$" actually achieved, will depend on the accuracy with which the inclination of the plane "$a$" and the accuracy of the cut and position of the teeth, to wit, that of the parameters "$a$" and "$d$". Since for use as a hole deviation device the angles "$a$" may vary from about 1° to about 4°, the accuracy of the inclination "$b$" may be a tolerance of less than about 10% of the values calculated for a specified value of "$a$". These variations arise from machine tolerance of the formation of the teeth, both as to spacing of the teeth and the slope of the crown and roots of the teeth. Variations ranging from about 3 to about 6% for slopes "$a$" of about 2° to 3° are within acceptable tolerance.

As will be seen by reference to the above equations, the angle of bend "$b$" is a function both of the azimuthal rotation "$d$" and the angle of the plane of the teeth "$a$". The value of "$b$" can thus be adjusted by a proper selection of the value of "$a$" and having chosen "$a$" by a proper adjustment of the rotation, i.e., the value of "$d$".

For practical purposes, as stated above, the angle "$b$" is taken as not greater than 4°. This arises from the fact that the permissible angle is that which permits the string whose bit is at the angle "$b$" to pass through the upper straight hole without digging into the wall. Where the hole is covered with metallic casing, this will cause the bit to gouge into the casing, with unacceptable damage.

Therefore, for practical purposes, the value of "$a$" is taken as less than about 10° and the adjustment "$d$" suitably set for the desired angle. For example, for "$a$" at 2°, the adjustment may be a full 180°, to set the angle "$b$" at 4°. For "$a$" at 8°, the angle "$b$" will range up to 4° when the value of "$d$" is increased to 60°. For a plane whose angle "$a$" is 10°, the rotation angle "$d$" will range up to a maximum of 60° for a 4° bend angle "$b$".

Since "$a$" and "$d$" are known, the angle "$b$" is established. The value of the angle "$b$" is marked on the periphery adjacent each tooth.

The vertical angle "$b$" for each azimuthal angle "$c$" may be determined directly from the unit itself. The part 23 is mounted vertically. The upper section 5 is mounted so that it is vertical, i.e., with the longitudinal axis of 5 and 23 coincident. The tooth whose center lies in the plane OC is marked O. The vertical distance "$e$" from the top of 5 (see FIG. 2) to the center of the O tooth along the surface of 5 is measured. A dial indicator is mounted along side of 5, so as to measure the horizontal displacement "$f$" of the intersect between "$e$" and the top of 5, as the part 5 is rotated from tooth to tooth with respect to 23 for each tooth position. The vertical angle of "$b$" at each tooth position is illustrated below:

$$,\ b = \sin^{-1} f/e$$

When the angles "$b$" are inscribed adjacent each tooth, which are thus indexing means it is merely necessary for the O mark on one part to be placed adjacent the desired degree mark on the other part to set the bent sub at the desired angle.

The bent sub is assembled by withdrawing the nut 12 and the parts 5 and 23 set in adjusting the part 5 on the part 23. For example, if the bend angle "$b$" is set for 3°, the tooth is adjusted by setting the O mark on 5 in line with the 3° mark on 23. The nut is then entered and the parts secured. The bent sub is then assembled in the string and the drill string is azimuthally oriented by techniques commonly used in the oil fields. The bent sub will establish the vertical angle of the bit.

I prefer to employ the bent sub of my invention together with the adjustable sub which is the subject matter of the copending application Ser. No. 683,193, now U.S. Pat. No. 4,067,404, to which reference is made.

I claim:

1. An adjustable bent sub comprising a hollow tubular box section, a box at one end of said box section, and a hollow tubular pin section, a pin at one end of the pin section, an end of the box section mating with an end of the pin section, the plane of the said end of the box section is inclined at an angle to the axis of the box section and the plane of said end of the pin section is inclined at an angle to the axis of the pin section, means to position the said box section and pin section at various azimuthal angles of displacement of the box section with respect to the pin section, means to lock said box section to said pin section at said azimuthal angular positions against angular displacement of one section relative to the other section, whereby the box section is positioned and locked at various vertical angles of the box section with respect of the pin section for each azimuthal position.

2. The adjustable sub of claim 1, in which said means to lock said pin section to said box section includes a jaw clutch between said pin section and said box section and means positioned in the hollow tubular sections for releasably connecting said tubular pin section to said tubular pin section.

3. The adjustable bent sub of claim 2 in which said releasable locking means comprises a nut positioned with one of the tubular sections and threaded into the other tubular section.

4. The adjustable bent sub of claim 1 in which said clutch is a jaw clutch, teeth positioned about the inclined end of the box section and complementary teeth positioned about the inclined end of the pin section, said teeth mating with each other, the crowns and roots of said teeth being positioned on said inclined planes.

5. The adjustable bent sub of claim 4 in which said means to lock said pin section to said box section includes a jaw clutch between said pin section and said box section and means positioned in the hollow tubular sections for releasably connecting said tubular pin section to said tubular pin section.

6. The adjustable bent sub of claim 5 in which said clutch is a jaw clutch, teeth positioned about the inclined end of the box section and complementary teeth positioned about the inclined end of the pin section, said teeth mating with each other, the crowns and roots of said teeth being positioned on said inclined planes.

7. An adjustable bent sub of claim 1 in which the angle of the inclined plane "$a$", the azimuthal angle "$d$", and the vertical angle "$b$" of the axis of the box end section to the pin end section, is given by the following relation:

$$\sin b = (\sin a \sin d)/\cos c$$

where $$c = \tan^{-1}[\cos a (1 - \cos d)/\sin d]$$

and $$b = \sin^{-1}[\sin a \cos a (1 - \cos d)/\sin c]$$

8. The adjustable bent sub of claim 5 in which "$b$" is less than about 4° and "$a$" is about 10° or less.

9. The adjustable bent sub of claim 5 in which said means to lock said pin section to said box section includes a jaw clutch between said pin section and said box section and means positioned in the hollow tubular sections for connecting said tubular pin section to said tubular box section, and locking said sections against angular displacement of one section relative to the other section, and to unlock the said sections to permit relative angular displacement of one section with respect of the other section.

10. The adjustable bent sub of claim 9 in which said releasable locking means comprises a nut positioned with one of the tubular sections and threaded into the other tubular section.

11. The adjustable bent sub of claim 6 in which said clutch is a jaw clutch, teeth positioned about the inclined end of the box section and complementary teeth positioned about the inclined end of the pin section, said teeth mating with each other, the crowns and roots of said teeth being positioned on said inclined planes and separated from each other at equal angular degrees.

12. The adjustable bent sub of claim 9 in which said means to lock said pin section to said box section includes a jaw clutch between said pin section and said box section and means positioned in the hollow tubular sections for releasably connecting said tubular pin section to said tubular pin section.

13. The adjustable bent sub of claim 12 in which said clutch is a jaw clutch, teeth positioned about the inclined end of the box section and complementary teeth positioned about the inclined end of the pin section, said teeth mating with each other, the crowns and roots of said teeth being positioned on said inclined planes and separated from each other at equal angular degrees.

14. The adjustable bent sub of claim 7, in which the parameter "$d$" may be varied by equal angular degrees.

* * * * *